Aug. 15, 1967 TAKESHI NAKAGAWA 3,336,445

HOLDING SYSTEM FOR GENERAL AUTOMATIC TELEPHONE CIRCUIT

Filed June 24, 1964 3 Sheets-Sheet 1

INVENTOR
TAKESHI NAKAGAWA
BY
Hopgood & Calimafde
ATTORNEYS

INVENTOR
TAKESHI NAKAGAWA

BY
Hopgood & Calimafde
ATTORNEYS

INVENTOR
TAKESHI NAKAGAWA
BY
Hopgood & Calimafde
ATTORNEYS

United States Patent Office 3,336,445
Patented Aug. 15, 1967

3,336,445

HOLDING SYSTEM FOR GENERAL AUTOMATIC TELEPHONE CIRCUIT

Takeshi Nakagawa, Tokyo, Japan, assignor to Nippon Electric Company Limited, Tokyo, Japan, a corporation of Japan Filed June 24, 1964, Ser. No. 377,663
Claims priority, application Japan, July 12, 1963, 38/38,109
6 Claims. (Cl. 179—89)

This invention relates to a telephone circuit holding system and in particular to an arrangement which may be employed with conventional automatic exchange equipment for maintaining the connection between the transmitter and unattended receiver of information transfer equipments such as facsimile, data transmission, telegraph and telescriber apparatus.

Although the arrangement according to the invention is adaptable generally to equipment of the foregoing type, reference will be made to facsimile (FAX) apparatus, in order to more clearly illustrate the problem inherent in transferring information via automatic telephone equipment, and subsequently FAX apparatus will also be alluded to in connection with a specific embodiment of the invention.

The requisites of a circuit holding system to be satisfied by the invention in which an unattended receiver is coupled to a subscribed substation, and in which the "hold" and "disconnect" of the telephone circuit, and the starting and stopping of the receiver is automatically and remotely controlled from the transmitting side, are as follows:

(1) Throughout the time period from the acquisition of the subscriber circuit until the completion of the information transmission, the DC loop of the called subscriber circuit must be closed. This is particularly important when a series of information is to be transmitted through a toll exchange system, since if the DC loop should open, due to a small interval in the successive transmissions, the toll trunk receiving equipment would regard it as clear-down and would send a clearing signal to the toll trunk transmitting equipment. As a consequence, it would become impossible for the transmitting side to carry on the remote control function and the automatic exchanges on both the transmitting and the receiving side would release the incoming and outgoing lines.

(2) Further, when there is a call from a third party subscriber having no information transfer equipment, the DC loop of the called subscriber should open and release the associated automatic exchange connector as promptly as possible; and when the call is from an information transmitter a similar result must be effectuated promptly after the completion of the transmission.

In order to satisfy the above described requirements, conventional unattended receivers use circuit holding devices which close the DC loop of their associated subscriber circuit, thereby holding the telephone circuit, only for a period of time $T_1$ after the reception of a 16 c./s. ringing signal. If no information arrives during this period, the loop is opened, while if an information is received, the loop is maintained closed. In the case of a single information, therefore, the telephone circuit is released as soon as the information has been transmitted. However, the circuit holding device of the receiver is also released in the case of a serial transmission, because the information is cut off for a period of time $T_2$, which is required by the transmitting operator for example to replace the facsimile copies. In order to prevent this, the automatic exchange at the tributary must always be kept ready for operation for the period of time $T_2$ after completion of transmission. This is obviously not a completely satisfactory solution since too small a $T_1$ and $T_2$ will permit the line to release upon any transmitting gap exceeding these periods. Lengthening the predetermined holding times, on the other hand, ties up equipment unnecessarily when in fact the transmission has been concluded. Furthermore, the use of timing relays to secure the time constants $T_1$ and $T_2$ makes the circuit holding device complicated in structure and expensive in cost.

Accordingly, it is the object of this invention to provide a circuit holding system which obviates the foregoing defects and maintains circuit continuity through automatic telephone exchange equipment with only a minimum time in excess of that actually necessary for the information transfer.

It is a further object of this invention to provide a holding system of the foregoing type which disposes of incoming calls to the receiver, from stations having no information transfer equipment, in a minimum of time.

Briefly, the invention is predicated upon the concept of initiating from the unattended receiver, when the telephone circuit has been completed, an answer signal indicating the connection-completion, and initiating from the transmitter a circuit-holding signal in response to the receiver answer signal; the latter signal being employed to close the receiver DC loop, thereby holding the exchange and trunk continuity until the completion of the information transmission.

The above mentioned and other features and objects of this invention and the manner of attaining them will become more apparent and the invention itself will best be understood by reference to the following description of an embodiment of the invention taken in conjunction with the accompanying drawings wherein.

Figure 1:
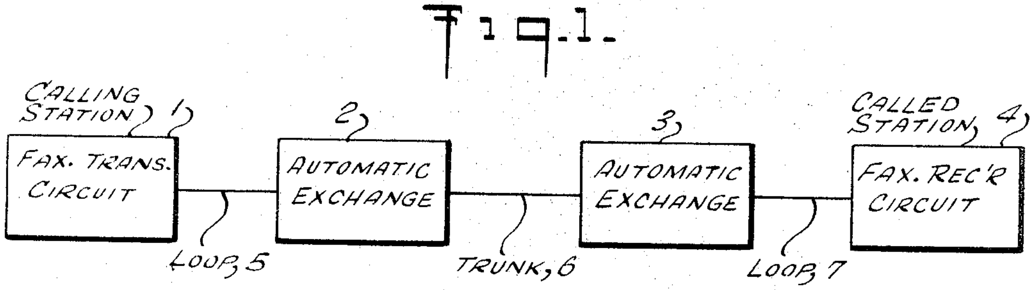
FIG. 1 is a block diagram illustrating the exchange and trunk coupling existing between the calling or transmitting subscriber and the called or receiving subscriber and their associated exchange loops.

Turning now to FIG. 1, there is shown, in block outline, the arrangement resulting from a call placed by the facsimile transmitting operator to the unattended receiver and established through the two automatic exchanges 2 and 3 (containing toll trunk transmitting and receiving equipment, respectively) and the trunk 6. The lines 5 and 7 are the usual loops for connecting the subscriber stations to the central offices and in the specific arrangement shown are connected to the calling or FAX transmitting station and the called or FAX receiving station 4.

Figure 2:
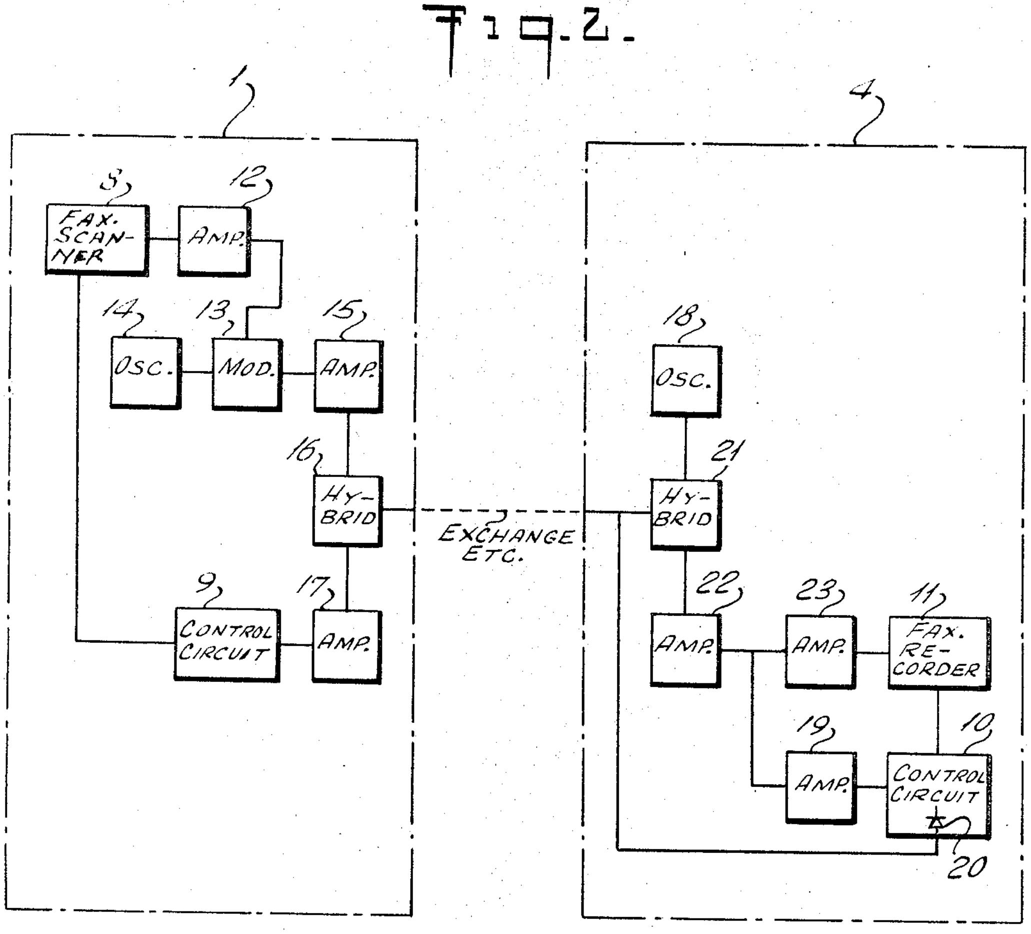
FIG. 2 illustrates in block schematic form the details of the transmitter and receiver circuits of FIG. 1.

FIG. 2 illustrates the transmitting and receiving circuits of FIG. 1 in greater detail; to be employed in conjunction with a general description of the invention. The scanning mechanism 8, of the transmitter 1, is of the rotating cylinder type. A photoelectrically converted signal of a message, drawing, picture or the like is amplified by the DC amplifier 12 and is applied, in conjunction with the local oscillator 14 output, to a modulator 13. The resultant amplitude modulated signal is then fed to the line via transmission amplifier 15 and hybrid coil 16.

Control circuit 9 receives an answer signal (the source of which will be described but which, for example, comprises a 500 c./s. continuous signal for reporting the completion of the connection and the concluded reception of the signal transmitted) from the called subscriber (receiver) through amplifier 17, and fulfills various functions such as the transmission of a circuit holding signal (e.g. at the carrier frequency) an automatic transmission, and the releasing of the telephone circuit upon call completion.

Meanwhile, the receiver 4 has received the conventional 16 c./s. call signal from its associated automatic exchange, through a rectifier 20, and by means of the control circuit 10 has started the receiving action; the first stage of which is an answer signal initiated by means of oscillator 18. The circuit holding signal from the transmitter is received by the circuit-holding amplifier 19 through a hybrid coil 21 and a receiving amplifier 22, holding the telephone circuit continuity under control of the control circuit 10. A phase signal which arrives after the circuit holding signal also acts upon the control circuit 10, for operating in the usual manner the automatic phase mechanism and synchronous motor of the recording mechanism 11 to ensure stylus synchronization with the FAX recorded. The actual information signal representing the message or picture is amplified by a recording amplifier 23 and is then fed to the recording stylus for the reproduction of a corresponding image.

Having given a rather brief summary of the interplay between the various transmitter and receiver signals and functions, their respective derivations and details will now be described with reference to FIGURES 3 and 4 which expand upon the circuitry of FIGURE 2, illustrating in greater detail the control circuits and FAX mechanisms shown only as boxes in that figure.

Assuming a single information transmission, the operator at the calling station dials the unattended receiver-subscriber telephone number, thus activating the automatic exchanges. Consequently, a 16 c./s. call signal is sent out by the called automatic telephone exchange arriving at the receiver (FIG. 4). The call signal is rectified by the rectifier 20 and operates the relay LA of the control circuit 10. (In the following, small letters will be employed to denote contacts of the associated relays denoted by similar letters in capitals.) Next, and via contact $1a_1$, a slow-releasing relay X operates and closes the subscriber circuit DC loop 7 by means of contact $x_1$; thus holding the automatic exchange 3 on the receiving side. The 16 c./s. exchange call signal now stops and the relay LA is released. Circuit continuity is now established from transmitter to receiver and to indicate this to the operator, the output of answer-signal-oscillator 18 is sent out through hybrid coil 21 (by virtue of contact $x_2$).

Figure 3:
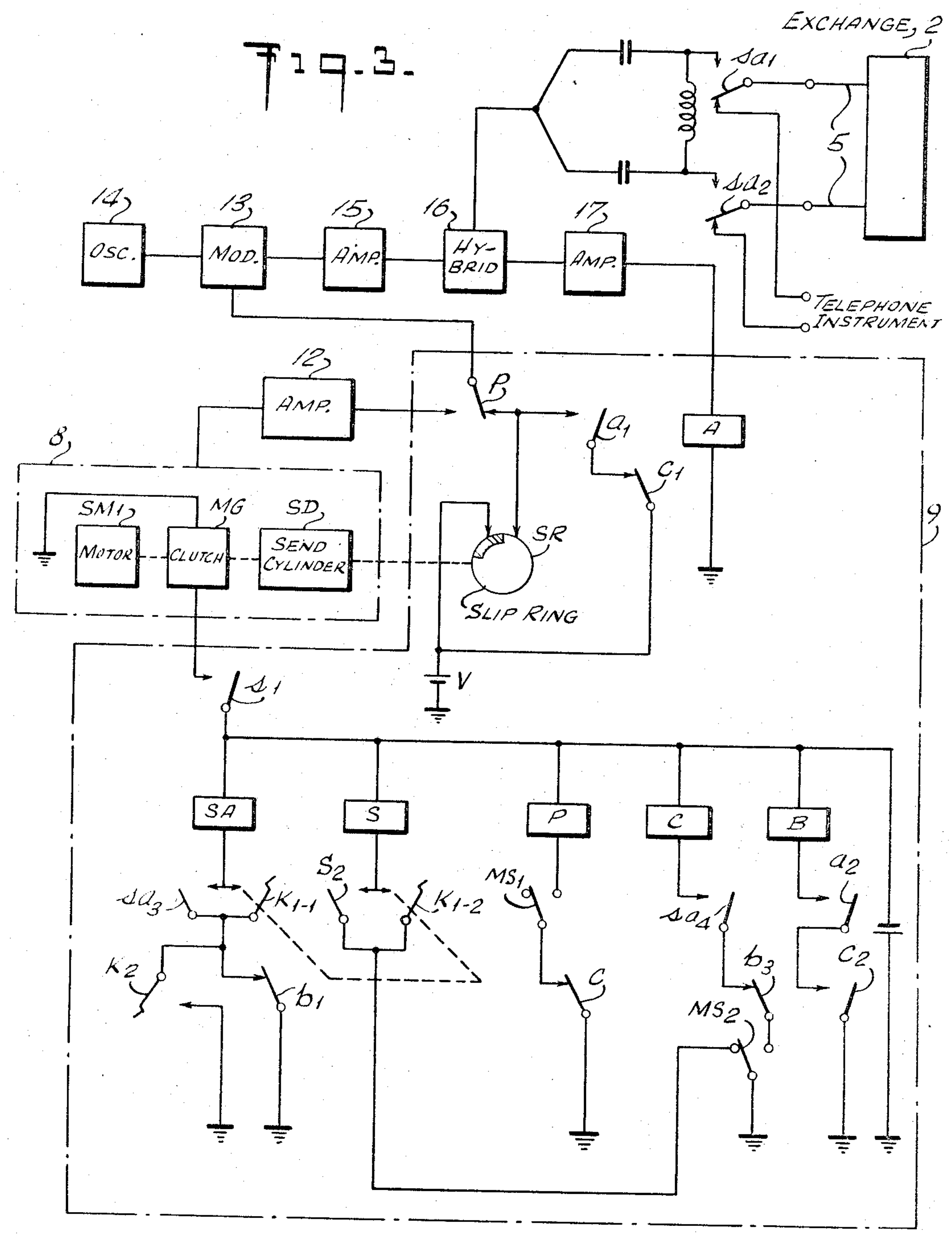
FIG. 3 illustrates in greater detail the transmitter shown in FIG. 2.
Figure 4:
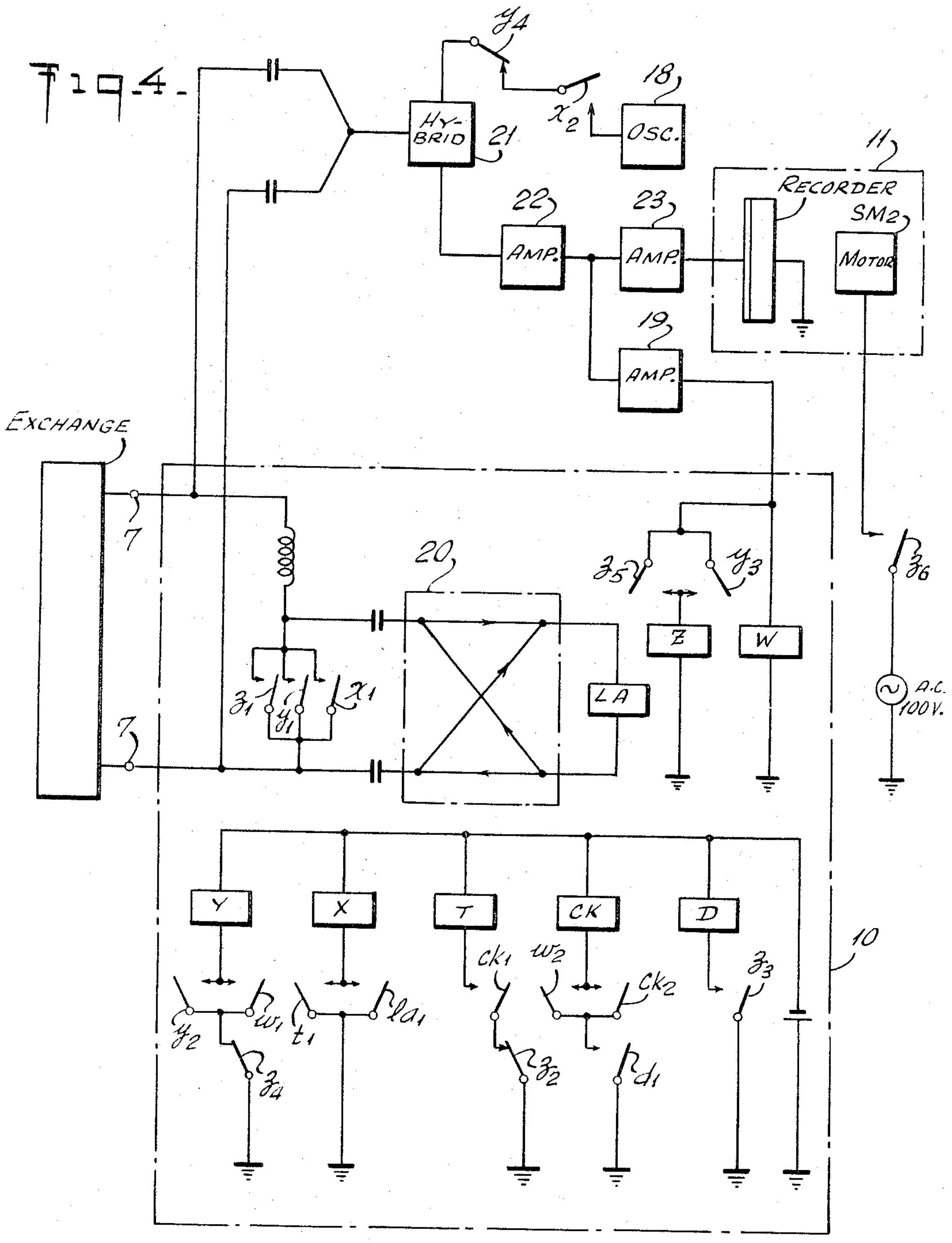
FIG. 4 illustrates in greater detail the receiver shown in FIG. 2.

Immediately upon hearing this connection-completion signal through the telephone, the transmitter operator presses the starting button $K_1$ of the transmitter (FIG. 3). This operates relay SA of the control circuit 9, as shown in FIG. 3, and the incoming line 5 is switched over, through $sa_1$ and $sa_2$, from the telephone to the output circuit of the transmitter. The connection-completion signal then operates a relay A through a hybrid coil 16 and answer amplifier 17, thereby applying a DC bias voltage V to modulator 13, through contact $c_1$ and $a_1$. As a consequence, the output of the carrier oscillator 14 is sent out as a circuit holding signal to the receiving side through the transmitting amplifier 15 and a hybrid coil 16.

In the receiver (FIG. 4), the reception of the circuit holding signal operates the relay W via the reception amplifier 22 and the circuit holding amplifier 19. By means of a contact $w_1$, the relay Y operates, and the subscriber circuit DC loop 7 is maintained closed by the contact $y_1$ after the release of the relay X.

In case the calling subscriber has no transmitter, a circuit holding signal is not received, Y does not operate, and the slow-releasing relay X opens the DC loop and releases the associated exchange. The holding time of the automatic exchange on the receiving side is thus minimized and is only several seconds.

Assuming again a call by the transmitter operator, the receiver now stops transmitting the connection-completion signal, the normally closed contact $y_4$ having opened, and relay A of the transmitter is released. Hence, via contact $a_1$, the circuit holding signal also stops. Remembering now that the starting button $K_1$ was pressed, the clutch magnet MG has operated by means of the relay S (energized via $k_{1-2}$), and sending cylinder SD is driven by the synchronous motor $SM_1$. The DC bias voltage V is thus applied to the modulator 13 by means of the slip ring SR, the output of the carrier oscillator 14 is keyed, and a phase signal is substituted for the circuit holding signal.

In the receiver the phase signal is led through the reception amplifier 22 and the circuit holding amplifier 19 and further through the relay W and the contact $y_3$; thereby operating the relay Z. The relay Z is of a slow-releasing type, and is operated while information (phase signal and picture signal) is being received, and is released when there is no more ensuing information. Thus, while information is being received, the subscriber circuit DC loop 7 is closed securely by means of a contact $z_1$. The relay Y, operated by the circuit holding signal is released by contact $z_4$.

The synchronous motor $SM_2$, for the recording mechanism 11, is connected to a 100 volt AC power source by a contact $z_6$ and is started. It attains the necessary number of synchronous revolutions before a slow-acting relay D is excited into operation by the contact $z_3$. After the relay D has been put into operation, an automatic phase inspection is effected (not shown). Upon the completion of the inspection, a relay CK is operated, and thus all the arrangements for recording are completed. The image signal is amplified by the recording amplifier 23 and is transcribed on the recording paper.

At the transmitter, the sending cylinder SD presses a microswitch $MS_2$ upon the completion of the facsimile transmission. This energizes the relay C and at the same time releases the relay S. The sending cylinder SD therefore stops when the clutch magnet MG kicks out in response to the contact $s_1$. The modulator 13 is freed of the DC bias voltage V, and the transmitter output is reduced to zero.

Accordingly, the input signal to the receiver becomes zero, and the relay Z is released. The slow-releasing relay T is operated by the normally closed contact $z_2$, which in turn operates the relay X again, and thus the receiver again sends out the signal from oscillator 18; this time as a reception-completion signal. The relays D and CK are also released following the release of relay Z, and as a consequence the relays T and X are released. The subscriber DC loop 7 is now opened by the contact $x_1$.

In the transmitter which has received the reception-completion signal from the receiver, the relay A operates through the answer amplifier 17. The relay B is operated by the contact $a_2$; the relay SA being released by the contact $b_1$. If the telephone receiver is on the hook at this juncture, the subscriber circuit DC loop 5 (FIG. 1) is opened, and the automatic exchange on the transmitting side is released. The relay C is released by the contact $sa_4$, followed by the relay B. Upon release of the automatic exchange 2 on the transmitting side, the automatic exchange on the receiving side is also released. Thus the exchange system is not held up after the completion of facsimile transmission.

Whether information is transmitted in a single copy or in a series of successive copies can be determined by the transmitter operator. In case of successive transmission, therefore, he presses down a change-over key $K_2$ to a side denoted successive transmission. Then, even if the relay B operates upon receiving the reception-completion signal, the relay SA remains in operation, and the DC loop 5 on the transmitting side is kept closed. The relay C is released by the contact $b_3$, and a DC bias voltage V is applied to the modulator 13 through the contacts $c_1$ and $a_1$. Thus, the transmitter again transmits the circuit holding signal to the receiver.

Here, even if the relay B is released, the sending cylinder SD automatically returns to the starting position and the microswitch $MS_2$ which activates upon the completion is back at the normal condition, and therefore the relay C will not operate again. The receiver receives the circuit holding signal as before via its circuit-holding amplifier 19 and the hybrid coil 21, while it is sending the reception-completion signal to the transmitter. This is carried out in the same manner as the reception of the circuit holding signal while transmitting the connection-completion signal in the case of singular transmission, as described earlier. The relays W and Y operate, and, before the relay X is released, the subscriber circuit DC loop 7 is closed with the contact $y_1$. Hence, the automatic exchange on the receiving side securely holds the telephone circuit for the information that is to ensue. Because the transmission of the reception-completion signal is stopped by the opening of contact $y_4$ in response to the energization of the Y relay, the transmitter also stops sending the circuit holding signal. Thus, the receiver remains waiting; the relays Z, D and CK being unenergized and the relay Y being self-held by contact $y_2$.

In the meanwhile, the transmitter operator replaces the facsimile copy with a new one, and presses the starting button $K_1$ of the transmitter. This operates relay S, the sending cylinder SD revolves, and a phase signal keyed by the slip ring SR is sent out.

The receiver receives the phase signal, the relay Z is operated, and the same operation as in the case of singular transmission is repeated.

In the foregoing description of an embodiment of the invention, the circuit holding signal is sent out by leaking the carrier oscillator output, since an AM system is already available. It is apparent, however, that when the circuit holding signal to be transmitted consists of either an oscillator output of a frequency different from the carrier frequency or a combination of more than two oscillator outputs (the type signal generally being dictated by the type information transfer system employing the invention), the receiver need only be provided with a circuit-holding amplifier set to receive either of the said signals. Also, where a facsimile transmission is effected by a frequency shift modulation system, the invention can employ either a mark or space frequency as the circuit holding signal.

While I have described above the principles of my invention in connection with specific apparatus, it is to be clearly understood that this description is made only by way of example and not as a limitation to the scope of my invention as set forth in the objects thereof and in the accompanying claims.

I claim:

1. A telephone circuit holding system for maintaining circuit continuity between the transmitter-subscriber and unattended receiver-subscriber of information transfer equipment, under control of the transmitter, comprising:

receiver means responsive to a call signal for initially closing the associated subscriber loop and issuing a connection-completion signal;

means at the transmitter for initiating a connection-hold signal upon receiving the connection-completion signal;

receiver means responsive to said connection-hold signal for securing the associated subscriber loop and cutting-off said connection-completion signal;

means at the transmitter for initiating the information transfer;

and receiver means responsive to the transmission of information for releasing said loop securing means and closing said loop for the duration of the information transfer.

2. The telephone circuit holding system claimed in claim 1 further comprising:

receiver means responsive to the cessation of an information transfer for initiating a reception-completion signal; and means at the transmitter responsive to said reception-completion signal for releasing the associated transmitter loop.

3. The telephone circuit holding system claimed in claim 2 in which the means at the transmitter for initiating a connection-hold signal comprises a two position device, one position of which precludes the said transmitter release of the loop in response to said reception-completion signal; and in which said reception-completion signal acts as a connection-completion signal.

4. The telephone circuit holding system claimed in claim 3 in which the receiver means responsive to a call signal comprises a slow release relay, contacts of which are across the associated subscriber loop.

5. The telephone circuit holding system claimed in claim 4 in which the receiver means for securing the loop comprises a self held relay, contacts of which are across the associated subscriber loop.

6. The telephone circuit holding system claimed in claim 5 in which the receiver means for releasing the loop securing means and closing the loop comprises a relay, one set of contacts of which are across the associated subscriber loop and a second set of contacts of which are in series with the winding of the self held relay.

References Cited

UNITED STATES PATENTS

| | | | |
|---|---|---|---|
| 1,880,311 | 10/1932 | Boose | 179—89 |
| 2,691,063 | 10/1954 | Michelini | 179—89 |

KATHLEEN H. CLAFFY, *Primary Examiner.*

H. ZELLER, *Assistant Examiner.*